(12) United States Patent
Baek et al.

(10) Patent No.: US 10,584,654 B2
(45) Date of Patent: Mar. 10, 2020

(54) FUEL REFORMING SYSTEM AND METHOD OF CONTROLLING FLOW RATE OF EXHAUST GAS RECIRCULATION GAS IN A FUEL REFORMER

(71) Applicants: Hyundai Motor Company, Seoul (KR); Kia Motors Corporation, Seoul (KR)

(72) Inventors: Hong Kil Baek, Seoul (KR); Seung Woo Lee, Seoul (KR); Tae Won Lee, Incheon (KR)

(73) Assignees: Hyundai Motor Company, Seoul (KR); Kia Motors Corporation, Seoul (KR)

( * ) Notice: Subject to any disclaimer, the term of this patent is extended or adjusted under 35 U.S.C. 154(b) by 0 days.

(21) Appl. No.: 15/831,256

(22) Filed: Dec. 4, 2017

(65) Prior Publication Data
US 2018/0163648 A1  Jun. 14, 2018

(30) Foreign Application Priority Data
Dec. 13, 2016  (KR) .......................... 10-2016-0169861

(51) Int. Cl.
*B01D 53/56* (2006.01)
*F02D 41/00* (2006.01)
(Continued)

(52) U.S. Cl.
CPC ....... *F02D 41/0077* (2013.01); *F02D 41/005* (2013.01); *F02M 26/02* (2016.02); *F02M 26/23* (2016.02); *F02M 26/52* (2016.02); *F02M 26/35* (2016.02); *F02M 26/36* (2016.02); *Y02T 10/47* (2013.01)

(58) Field of Classification Search
CPC ........ F02M 26/36; F02M 26/35; F02M 26/02; F02M 26/23; F02M 26/52; Y02T 10/47; F02D 41/0077; F02D 41/005
See application file for complete search history.

(56) References Cited

U.S. PATENT DOCUMENTS

2011/0274606 A1* 11/2011 Melville ............ B01D 53/9409
423/239.1
2012/0285400 A1* 11/2012 Inuzuka .................. F02D 41/04
123/3

(Continued)

*Primary Examiner* — Hai H Huynh
*Assistant Examiner* — Gonzalo LaGuarda
(74) *Attorney, Agent, or Firm* — Morgan, Lewis & Bockius LLP

(57) ABSTRACT

A fuel reforming system may include an engine combusting reformed gas to generate mechanical power; an intake line connected to the engine to supply reformed gas and air to the engine; an exhaust line connected to the engine to circulate exhaust gas exhausted from the engine; a fuel reformer provided at an exhaust gas recirculation (EGR) line diverging from the exhaust line, mixing the EGR gas passing through the EGR line with the fuel and reforming the fuel mixed in the EGR gas; and an EGR flow controller determining a target opening degree of a flow rate control valve according to engine running condition, whether or not in a reforming running condition, required amount of EGR gas along to running condition, and controlling opening degree of the flow rate control valve on a basis of the target opening degree.

11 Claims, 6 Drawing Sheets

(51) Int. Cl.
  *F02M 26/02* (2016.01)
  *F02M 26/23* (2016.01)
  *F02M 26/52* (2016.01)
  *F02M 26/35* (2016.01)
  *F02M 26/36* (2016.01)

(56) References Cited

U.S. PATENT DOCUMENTS

2012/0291424 A1* 11/2012 Inuzuka ............... F01N 11/002
  60/299
2012/0297766 A1* 11/2012 Inagaki ................. F02M 26/11
  60/605.2
2015/0075451 A1* 3/2015 Inuzuka ............. F02D 41/0065
  123/3

* cited by examiner

2

FUEL REFORMING SYSTEM AND METHOD OF CONTROLLING FLOW RATE OF EXHAUST GAS RECIRCULATION GAS IN A FUEL REFORMER

CROSS-REFERENCE(S) TO RELATED APPLICATIONS

The present application claims priority to Korean Patent Application No. 10-2016-0169861 filed on Dec. 13, 2016, the entire contents of which are incorporated herein for all purposes by this reference.

BACKGROUND OF THE INVENTION

Field of the Invention

The present invention relates to a fuel reforming system and method of controlling flow rate of exhaust gas recirculation gas in a fuel reformer. More particularly, the present invention relates to a fuel reforming system and method of controlling the flow rate of exhaust gas recirculation (EGR) gas in a fuel reformer which controls the amount of EGR gas on a basis of the required amount of EGR gas according to an engine running condition.

Description of Related Art

Generally, an exhaust gas recirculation (EGR) system is a system which is disposed in a vehicle for decreasing noxious exhaust gas.

The present exhaust gas recirculation system reduces oxygen amount in a mixer by circulating a portion of the exhaust gas exhausted from the engine, reduces exhaust amount of the exhaust gas, and reduces toxic matters in the exhaust gas.

Also, the exhaust gas exhausted from the engine has a high temperature, therefore the engine efficiency may be improved by utilizing the thermal energy of the exhaust gas.

Meanwhile, a fuel reformer is a device which changes fuel characteristics by use of a catalyst, and the fuel reformer may be applied for increasing combustion efficiency or activating a post processing system. The fuel reformer has a structure that EGR gas flowed in and sprayed fuel is naturally mixed in a mixing chamber. The fuel and EGR gas is not mixed well due to the fluid velocity decreasing when the amount of the EGR is less, therefore reforming efficiency is deteriorated.

The information disclosed in this Background of the Invention section is only for enhancement of understanding of the general background of the invention and should not be taken as an acknowledgement or any form of suggestion that this information forms the prior art already known to a person skilled in the art.

BRIEF SUMMARY

Various aspects of the present invention are directed to providing a fuel reforming system and method of controlling flow rate of exhaust gas recirculation gas in a fuel reformer in which a flow rate control valve is disposed at an entrance of an EGR pipe in which EGR gas of the fuel reformer flows, thus controls the cross section area of the entrance of the EGR pipe according to the required amount of EGR gas.

A fuel reforming system according to an exemplary embodiment of the present invention includes an engine combusting reformed gas to generate mechanical power; an intake line connected to the engine to supply reformed gas and air to the engine; an exhaust line connected to the engine to circulate exhaust gas exhausted from the engine; a fuel reformer provided at an exhaust gas recirculation (EGR) line diverging from the exhaust line, into which fuel is injected from the EGR line, in which the fuel injected from the EGR line and the EGR gas are mixed, and reforming the fuel mixed in the EGR gas; and an EGR flow controller determining a target opening degree of a flow rate control valve according to engine running condition, whether or not in a reformingrunning condition, required amount of EGR gas along to running condition, and controlling opening degree of the flow rate control valve on a basis of the target opening degree.

The fuel reformer may include a housing; a mixing portion provided in the housing and being a space mixing the fuel supplied from outside and the EGR gas; a fuel injector disposed at one side of the housing and supplying the fuel to the mixing portion; an EGR pipe connected to the mixing portion in which the EGR gas flows; a flow rate control valve disposed at the EGR pipe and adjusting amount of the EGR gas passing through the EGR pipe; and a reforming catalyst portion provided at an other side of the mixing portion and reforming the fuel and EGR gas mixed in the mixing portion.

A shutter device adjusting the flow rate of the EGR gas flowed in through the EGR pipe and exhausted toward the mixing portion may be included in the flow rate control valve.

The shutter device is rotated toward a direction of flow of the EGR gas and of which angle is adjusted, thus exhaust amount of the EGR may be determined.

The exhaust amount compared with inflow amount of the EGR gas may be 5% when the shutter device is rotated by 10% angle in a direction of crossing to a flow direction of the EGR gas.

The exhaust amount compared with inflow amount of the EGR gas may be 30% when the shutter device is rotated by 100% angle in a direction of crossing to a flow direction of the EGR gas.

The fuel reforming system according to an exemplary embodiment of the present invention may further include a compressor connected to the intake line and compresses the reformed gas and air to supply to the engine; and a turbine connected to the exhaust line and rotates by the exhaust gas to generate power.

The fuel reforming system according to an exemplary embodiment of the present invention may further include a catalyst disposed at the exhaust line of rear portion of the EGR line and purifying the nitrogen oxide included in the exhaust gas.

The catalyst may include a lean NOx trap (LNT) which traps the nitrogen oxide included in the exhaust gas in a lean condition and desorbs the trapped nitrogen in a rich condition, and restores the nitrogen oxide included in the exhaust gas or the desorbed nitrogen oxide.

The catalyst may include a selective catalytic reducer (SCR) restoring the nitrogen oxide included in the exhaust gas by use of reducing agent.

At the EGR line, an EGR cooler cooling the reformed gas, and an EGR valve disposed at a rear end portion of the EGR cooler and adjusting flow rate of the reformed gas may be disposed.

The reformer may be disposed at a front portion of the EGR cooler in the EGR line.

The EGR flow controller may reduce the opening degree of the flow rate control valve when the opening degree of the flow rate control valve exceeds a target opening degree of the flow rate control valve according to the required amount of EGR gas.

The EGR flow controller may increase the opening degree of the flow rate control valve when the opening degree of the flow rate control valve is below a target opening degree of the flow rate control valve according to the required amount of EGR gas.

The running condition of the engine may be revolutions per minute (RPM) of the engine and engine torque.

Meanwhile, a method of controlling flow rate of exhaust gas recirculation gas of a fuel reformer mixing the EGR gas passing through the EGR line with the fuel and reforming the fuel mixed in the EGR gas according to an exemplary embodiment of the present invention includes detecting the running condition of an engine; determining whether or not the engine running condition is in a reforming running condition; determining the required amount of EGR gas required in the engine running condition when the engine running condition is in the reforming running condition; determining a target opening degree of a flow rate control valve on a basis of the required amount of EGR gas; comparing an opening degree of the flow rate control valve with the target opening degree; and reducing the opening degree of the flow rate control valve when the opening degree of the flow rate control valve exceeds the target opening degree.

The method according to an exemplary embodiment of the present invention may include increasing the opening degree of the flow rate control valve when the opening degree of the flow rate control valve is below the target opening degree.

The opening degree of the flow rate control valve may be adjusted by rotation of a shutter device adjusting the flow rate of the EGR gas flowed in through the EGR pipe and exhausted toward the mixing portion.

The running condition of the engine is revolutions per minute (RPM) of the engine and engine torque.

According to an exemplary embodiment of the present invention, mixing rate of the EGR gas and the fuel may be improved by mounting a flow rate control valve at an entrance of the EGR pipe of the fuel reformer to control the cross section area of the entrance of the EGR pipe according to the required amount of EGR gas.

Also, reforming efficiency of the fuel may be improved by improving the mixing rate of the EGR gas and the fuel.

The methods and apparatuses of the present invention have other features and advantages which will be apparent from or are set forth in more detail in the accompanying drawings, which are incorporated herein, and the following Detailed Description, which together serve to explain certain principles of the present invention.

Figure 1:
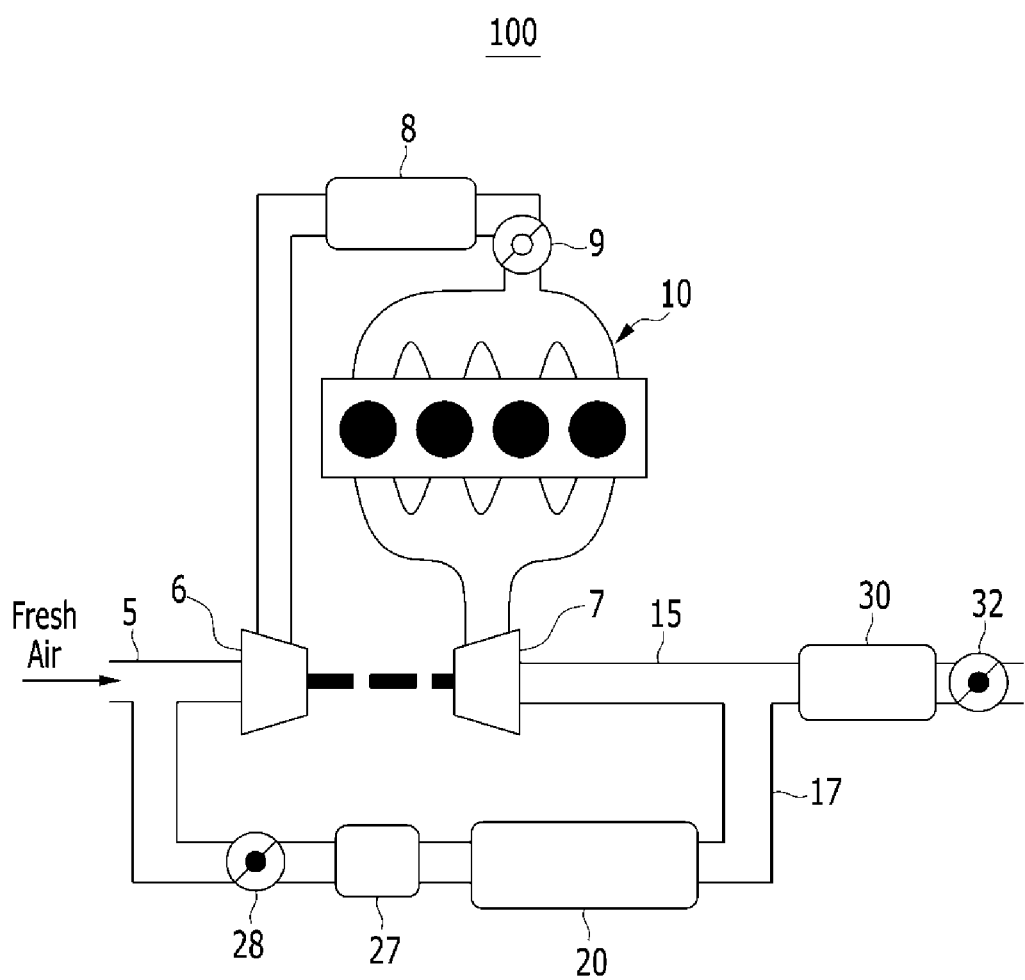
FIG. 1 is a schematic view illustrating a fuel reforming system according to an exemplary embodiment of the present invention.

It should be understood that the appended drawings are not necessarily to scale, presenting a somewhat simplified representation of various features illustrative of the basic principles of the invention. The specific design features of the present invention as disclosed herein, including, for example, specific dimensions, orientations, locations, and shapes will be determined in part by the particular intended application and use environment.

In the figures, reference numbers refer to the same or equivalent parts throughout the several figures of the drawing.

DETAILED DESCRIPTION

Reference will now be made in detail to various embodiments of the present invention(s), examples of which are illustrated in the accompanying drawings and described below. While the invention(s) will be described in conjunction with exemplary embodiments, it will be understood that the present description is not intended to limit the invention(s) to those exemplary embodiments. On the contrary, the invention(s) is intended to cover not only the exemplary embodiments, but also various alternatives, modifications, equivalents and other embodiments, which may be included within the spirit and scope of the invention as defined by the appended claims.

It will be understood that when an element including a layer, film, region, or substrate is referred to as being "on" another element, it can be directly on the other element or intervening elements may also be present.

Now, a fuel reforming system and a fuel reformer according to an exemplary embodiment of the present invention will be described with reference to FIG. 1 and FIG. 2.

Figure 2:
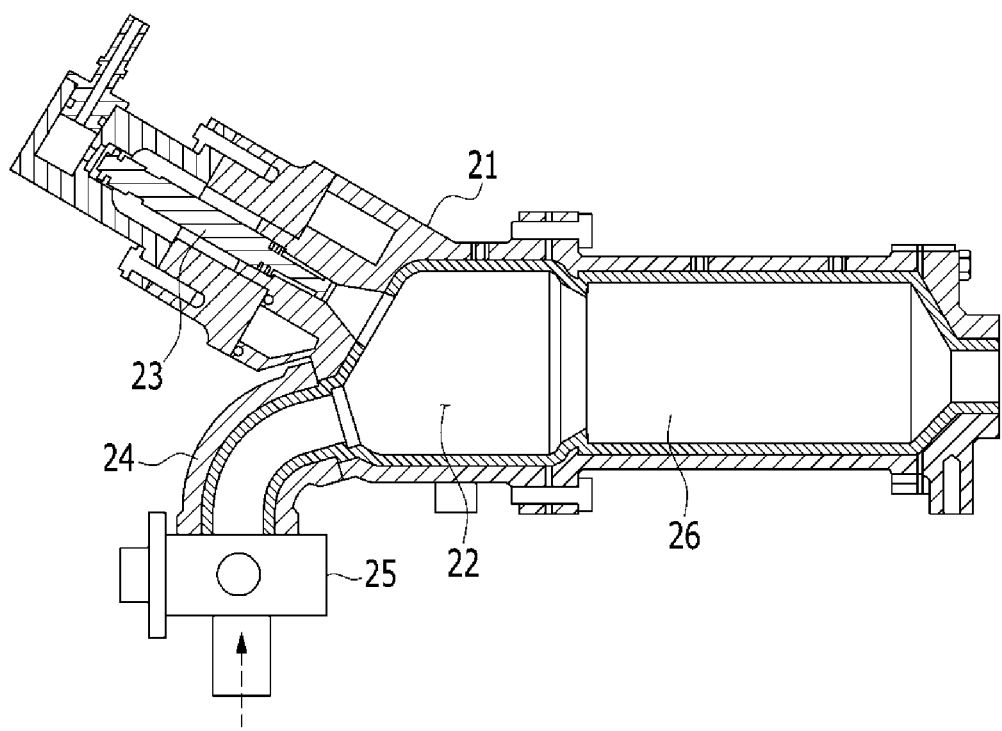
FIG. 2 is a schematic view illustrating a fuel reformer according to an exemplary embodiment of the present invention.

FIG. 1 is a schematic view illustrating a fuel reforming system according to an exemplary embodiment of the present invention, and FIG. 2 is a schematic view illustrating a fuel reformer according to an exemplary embodiment of the present invention.

Referring to FIG. 1, a fuel reforming system 100 includes an engine 10, an intake line 5, an exhaust line 15, a fuel reformer 20, and an EGR flow controller.

The engine 10 burns the air and fuel mixture in which fuel and air are mixed to convert chemical energy into mechanical energy. The engine 10 is connected to an intake manifold to receive the air in a combustion chamber, and is connected to an exhaust manifold wherein exhaust gas generated in combustion process is gathered in the exhaust manifold and is exhausted to the external. An injector is mounted in the combustion chamber to inject the fuel into the combustion chamber.

A diesel engine is exemplified herein, but a lean-burn gasoline engine may be used. In a case that the gasoline engine is used, the air and fuel mixture flows into the combustion chamber through the intake manifold, and a spark plug is mounted at an upper portion of the combustion chamber. In a case that the gasoline engine is used, the air and fuel mixture flows into the combustion chamber through the intake manifold, and a spark plug is mounted at an upper portion of the combustion chamber.

In addition, the engines having various compression ratios, preferably a compression ratio lower than or equal to 16.5, may be used.

The intake line 5 is connected to the entrance of the engine 10 to supply reformed gas and air to the engine 10, and the exhaust line 15 is connected to exit of the engine 10 to circulate exhaust gas exhausted from the engine 10.

A portion of the exhaust gas exhausted from the engine is supplied to the engine 10 through the EGR line 17. Also, the EGR line 17 is connected to the intake manifold so that the combustion temperature is controlled by mixing a portion of the exhaust gas with air. The present combustion temperature control is conducted by adjusting the exhaust gas amount supplied to the intake manifold. Accordingly, EGR valve 28 adjusting flow rate of the reformed gas may be disposed in the EGR line 17.

An exhaust gas recirculation system realized by the EGR line 17 supplies a portion of the exhaust gas to the intake system and inflows to combustion chamber when the exhaust amount of the nitrogen oxide needs to be reduced according to the running condition. Then, the exhaust gas that is inert gas whose volume is not changed depresses the density of the air and fuel mixture, and flame transmitting speed is reduced during the combustion of the fuel. Therefore, combustion velocity of the fuel is reduced and the raise of the combustion temperature is reduced to depress generation of the nitrogen oxide.

The fuel reformer 20 is disposed at the EGR line 17 diverging from the exhaust line 15 and mixes the exhaust gas with fuel to reform the fuel mixed with the exhaust gas.

As shown in FIG. 2, the fuel reformer 20 includes a housing 21, a mixing portion 22 being a compartment for mixing the fuel supplied from outside and the EGR gas, a fuel injector 23 supplying the fuel to the mixing portion 22, an EGR pipe 24 in which the EGR gas flows, a flow rate control valve 25 adjusting the amount of the EGR gas passing through the EGR pipe 24, and a reforming catalyst portion 26 reforming the fuel and EGR gas mixed in the mixing portion 22.

The mixing portion 22 is provided in the housing 21, and is a compartment for mixing the fuel supplied from outside by the fuel injector 23 and EGR gas flowed in from the EGR pipe 24.

The fuel injector 23 is disposed at one side of the housing 21, and the flow rate control valve 25 is disposed at the EGR pipe 25. The flow rate control valve 25 adjusts the amount of EGR gas passing through the EGR pipe 24. The reforming catalyst portion 26 is provided at an opposite side to the side on which the EGR pipe 24 is located, and reforms the fuel and EGR gas mixed in the mixing portion 22.

Meanwhile, the EGR flow controller may determine a target opening degree of a flow rate control valve 25 according to engine running condition, whether or not in a reforming running condition, required amount of EGR gas along to a running condition, and control the opening degree of the flow rate control valve 25 on a basis of the target opening degree. At the present time, the running condition of the engine 10 may be revolutions per minute (RPM) of the engine 10 and engine torque.

Figure 3:
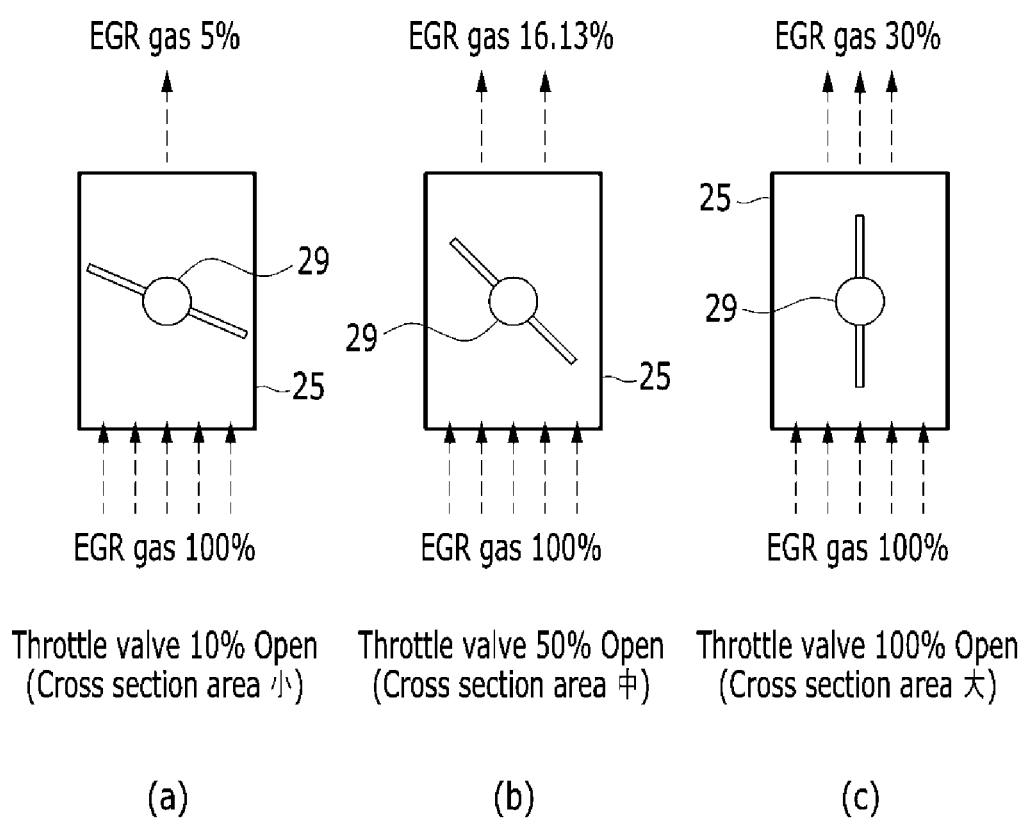
FIG. 3 is a drawing illustrating an example of operation of a flow rate control valve according to an exemplary embodiment of the present invention.

FIG. 3 is a drawing illustrating an example of operation of a flow rate control valve according to an exemplary embodiment of the present invention.

Referring to FIG. 3, a shutter device 29 adjusting the flow rate of the EGR gas flowed in through the EGR pipe 24 and exhausted toward the mixing portion 22 is disposed in the flow rate control valve 25.

Figure 6:
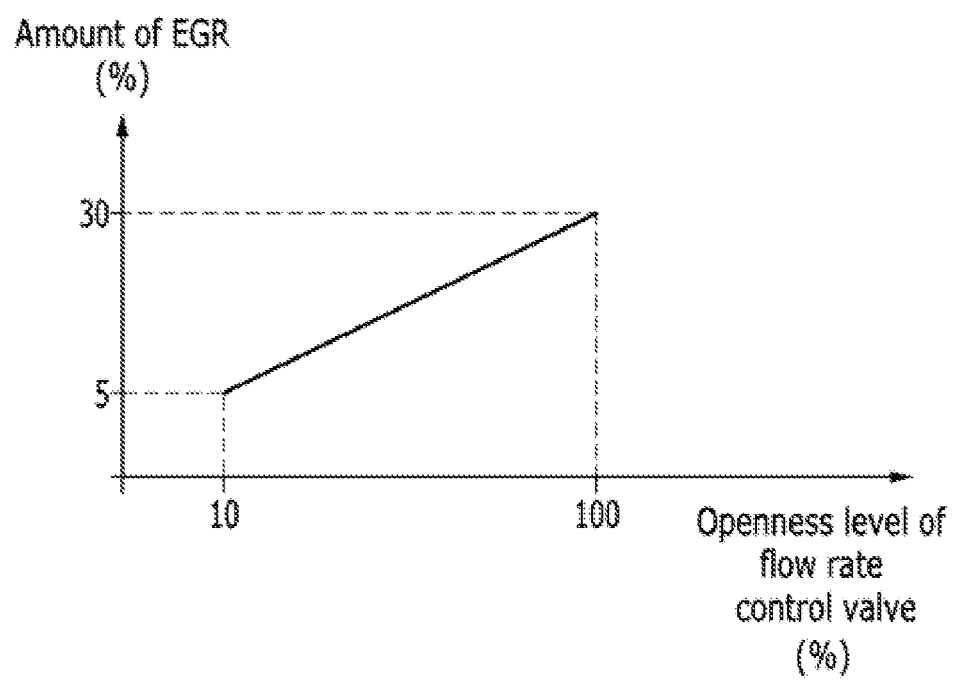
FIG. 6 is a graph illustrating exhausted amount of EGR gas according to opening degree of a flow rate control valve according to an exemplary embodiment of the present invention.

The shutter device 29 is rotated toward a direction of flow of the EGR gas and of which angle is adjusted, thus the exhaust amount of the EGR is determined. As shown in FIG. 3, when it is supposed that the EGR gas flowed in the flow rate control valve 25 is 100%, the exhausted amount of the EGR gas may be approximately 5% in a case that opening degree of the flow rate control valve 25, that is, rotation angle of the shutter device 29 toward a direction of flow of the EGR gas is approximately 9 degrees (approximately 10%) (a). Also, the exhausted amount of the EGR gas may be approximately 16.13% in a case that opening degree of the flow rate control valve 25, that is, rotation angle of the shutter device 29 toward a direction of flow of the EGR gas is approximately 45 degrees (approximately 50%) (b). Further, the exhausted amount of the EGR gas may be approximately 30% in a case that opening degree of the flow rate control valve 25, that is, rotation angle of the shutter device 29 toward a direction of flow of the EGR gas is about 90 degrees (approximately 100%) (c). Relationship between the opening degree of the flow rate control valve 25 and exhausted amount of the EGR gas is shown in FIG. 6.

Meanwhile, the fuel reforming system 100 according to an exemplary embodiment of the present invention may further include a compressor 6 connected to the intake line 5 configured to compress the reformed gas and air to supply to the engine 10, and a turbine 7 connected to the exhaust line 15 configured to rotate by the exhaust gas to generate power.

Also, the reforming system may include an intercooler 8 connected to the compressor 6 configured to cool air and reformed gas flowed into the intake line 5 of the engine 10 again, and a throttle valve 9 adjusting flow rate of the air and reformed gas.

Also, the fuel reforming system 100 according to an exemplary embodiment of the present invention may further include a catalyst 30 disposed at the exhaust line 15 of rear portion of the EGR line 17 configured to purify the nitrogen oxide included in the exhaust gas.

The catalyst 30 may include a lean $NO_x$ trap (LNT) which traps the nitrogen oxide included in the exhaust gas in a lean condition and desorbs the trapped nitrogen in a rich condition, and restores the nitrogen oxide included in the exhaust gas or the desorbed nitrogen oxide. The LNT may oxidize carbon monoxide (CO) and hydrocarbon (HC) included in the exhaust gas. Here, it may be understood that the hydrocarbon is used to imply a compound including carbon and hydrogen in exhaust gas and fuel.

Also, the catalyst 30 may include a selective catalytic reducer (SCR) restoring the nitrogen oxide included in the exhaust gas by use of a reducing agent. The reducing agent may be urea injected from an injection module.

An exhaust pressure control valve 32 adjusting the flow rate of the exhaust gas may be provided at a rear end portion of the catalyst 30 in the exhaust line 15.

Meanwhile, at the EGR line 17, an EGR cooler 27 cooling the reformed gas, and an EGR valve 28 disposed at a rear end portion of the EGR cooler 27 and adjusting flow rate of the reformed gas may be disposed.

At the present time, the fuel reformer 20 may be disposed at a front portion of the EGR cooler 27 in the EGR line 17.

Meanwhile, the EGR flow controller may control to reduce the opening degree of the flow rate control valve when the opening degree of the flow rate control valve 25 exceeds a target opening degree of the flow rate control valve 25 according to the required amount of EGR gas.

Also, the EGR flow controller may control to increase the opening degree of the flow rate control valve when the opening degree of the flow rate control valve 25 is below a target opening degree of the flow rate control valve 25 according to the required amount of EGR gas.

Figure 4:
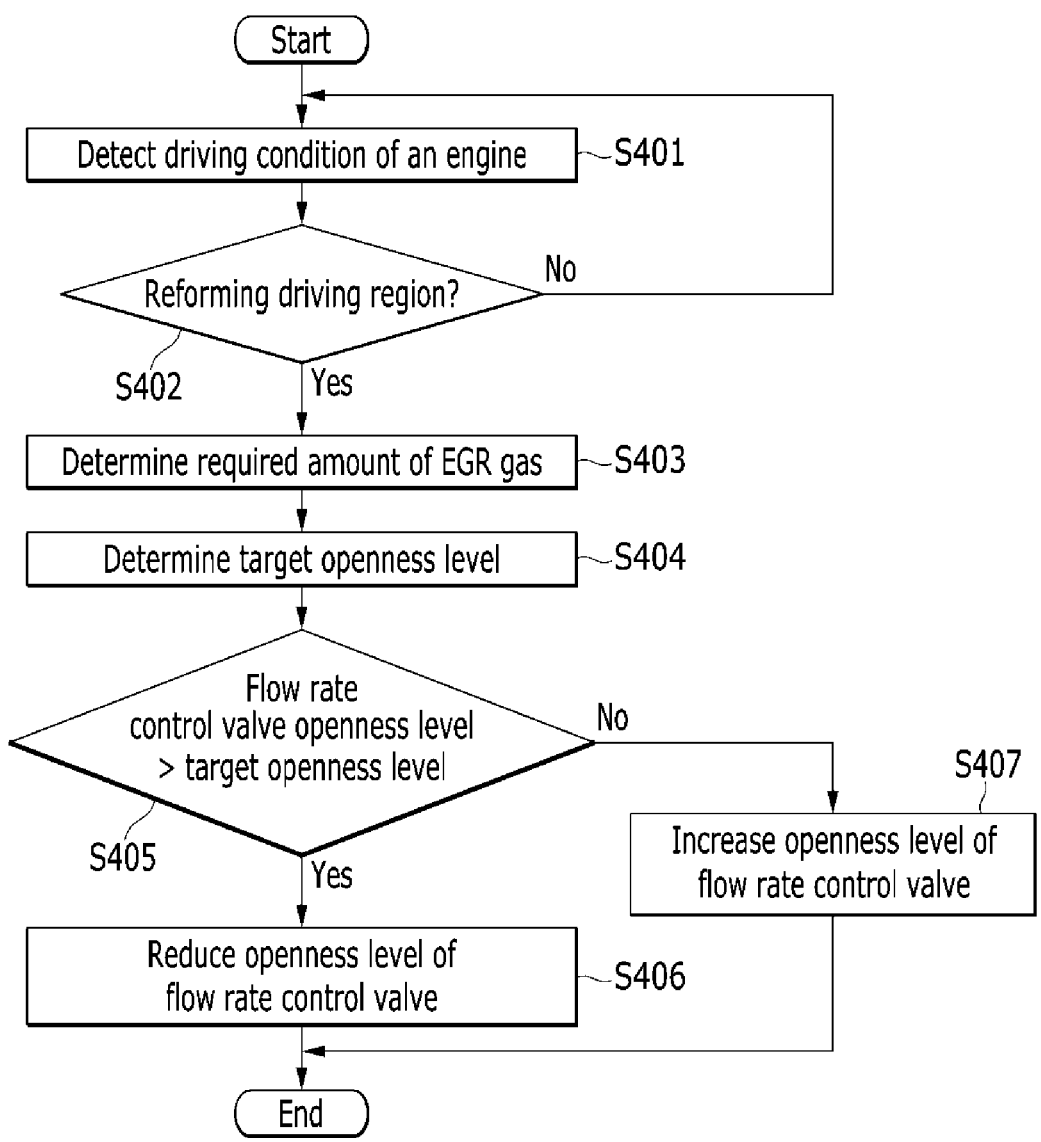
FIG. 4 is a flowchart illustrating a method of controlling flow rate of exhaust gas recirculation gas in a fuel reformer according to an exemplary embodiment of the present invention.
Figure 5:
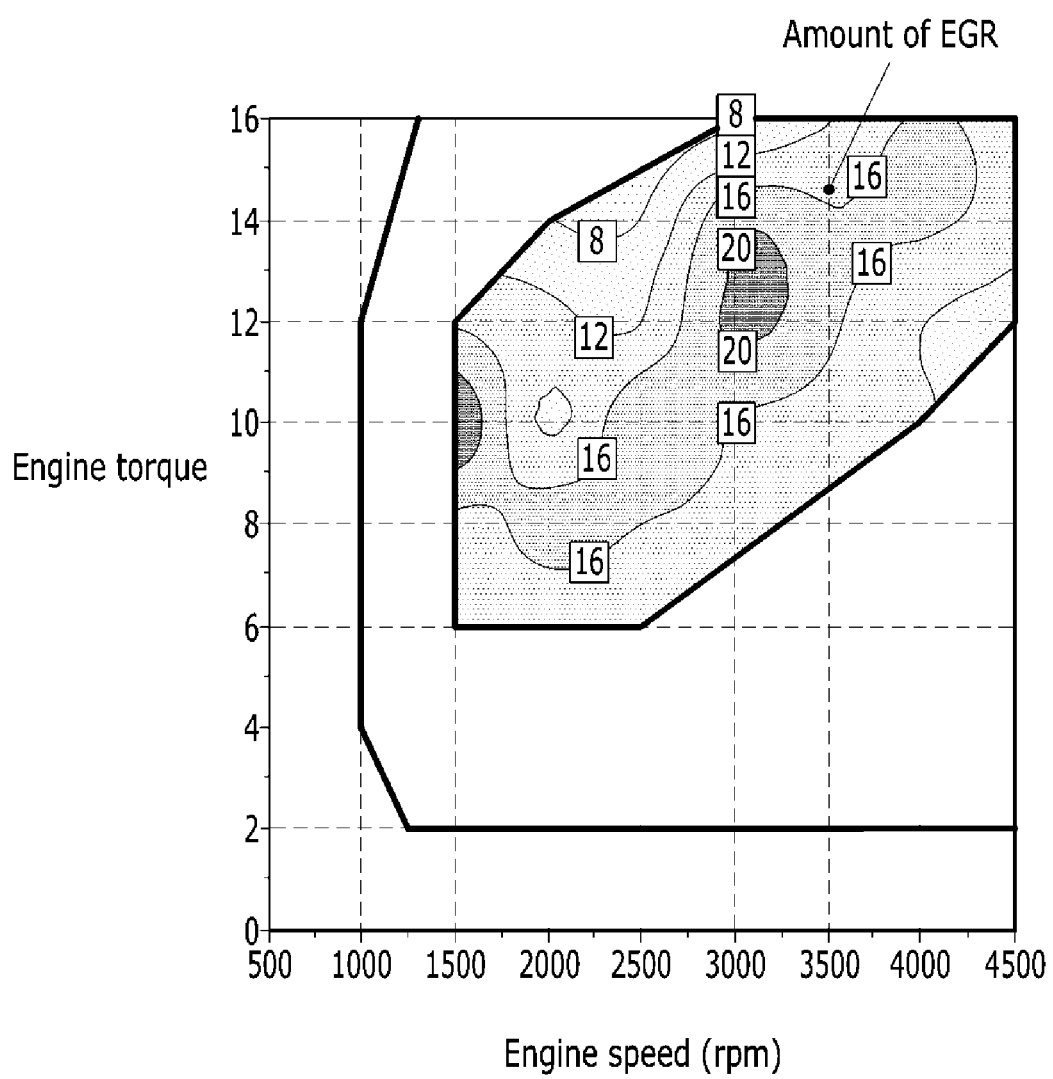
FIG. 5 is a graph illustrating required amount of EGR gas according to engine running condition according to an exemplary embodiment of the present invention.

FIG. 4 is a flowchart illustrating a method of controlling flow rate of exhaust gas recirculation gas in a fuel reformer according to an exemplary embodiment of the present invention, FIG. 5 is a graph illustrating required amount of EGR gas according to engine running condition according to an exemplary embodiment of the present invention, and FIG. 6 is a graph illustrating exhausted amount of EGR gas according to opening degree of a flow rate control valve according to an exemplary embodiment of the present invention.

Referring to FIG. 4, a method of controlling the flow rate of exhaust gas recirculation gas of a fuel reformer mixing the EGR gas passing through the EGR line with the fuel and reforming the fuel mixed in the EGR gas includes detecting running condition of an engine S401. The running condition of the engine may be revolutions per minute (RPM) of the engine and engine torque.

Then, whether or not the engine running condition is in a reforming running condition is determined S402. Then, the required amount of EGR gas required in the engine running condition is determined when the engine running condition is in the reforming running condition S403. As shown in FIG. 5, when the rotation speed of the engine and engine load is determined, the required amount of EGR gas in the reforming running condition may be determined.

Then, a target opening degree of a flow rate control valve is determined on a basis of the required amount of EGR gas S404. Amount of the EGR gas flowed in through the EGR pipe is measured and required amount of EGR gas through a graph illustrated in FIG. 5 is determined, a ratio of the required amount of EGR gas compared with amount of the EGR gas flowed in through the EGR pipe may be determined. Through this ratio, as shown in FIG. 6, a target opening degree of the flow rate control valve may be determined. Opening degree of the throttle illustrated in FIG. 6 means a ratio of rotation angle of the shutter device 29 in a direction of crossing to a flow direction of the EGR gas.

Then, an opening degree of the flow rate control valve is compared with the target opening degree S405, and the opening degree of the flow rate control valve is reduced when the opening degree of the flow rate control valve exceeds the target opening degree S406. Meanwhile, the opening degree of the flow rate control valve is increased when the opening degree of the flow rate control valve is below the target opening degree S407.

As described above, the opening degree of the flow rate control valve may be adjusted by rotation of a shutter device adjusting the flow rate of the EGR gas flowed in through the EGR pipe and exhausted toward the mixing portion.

Like the above, according to an exemplary embodiment of the present invention, mixing rate of the EGR gas and the fuel may be improved by mounting a flow rate control valve at an entrance of the EGR pipe of the fuel reformer to control cross section area of the entrance of the EGR pipe according to required amount of EGR gas.

Also, reforming efficiency of the fuel may be improved by improving the mixing rate of the EGR gas and the fuel.

For convenience in explanation and accurate definition in the appended claims, the terms "upper", "lower", "internal" and "outer", "up," "down," "upper", "lower," "upwards," "downwards", "front", "rear", "back", "inside", "outside", "inwardly," "outwardly," "internal", "external", "internal," "outer", "forwards" and "backwards" are used to describe features of the exemplary embodiments with reference to the positions of such features as displayed in the figures.

The foregoing descriptions of specific exemplary embodiments of the present invention have been presented for purposes of illustration and description. They are not intended to be exhaustive or to limit the invention to the precise forms disclosed, and obviously many modifications and variations are possible in light of the above teachings. The exemplary embodiments were chosen and described to explain certain principles of the invention and their practical application, to enable others skilled in the art to make and utilize various exemplary embodiments of the present invention, as well as various alternatives and modifications thereof. It is intended that the scope of the invention be defined by the Claims appended hereto and their equivalents.

What is claimed is:

1. A fuel reforming system, comprising
an engine combusting reformed gas to generate mechanical power;
an intake line connected to the engine to supply the reformed gas and air to the engine;
an exhaust line connected to the engine to circulate exhaust gas exhausted from the engine;
a fuel reformer provided at an exhaust gas recirculation (EGR) line diverging from the exhaust line, into which fuel is injected through the EGR line, in which the fuel injected through the EGR line and the EGR gas are mixed, and reforming the fuel mixed in the EGR gas; and
an EGR flow controller configured for determining a required amount of EGR gas in an engine running condition when the engine running condition is in a reforming running condition, and a target opening degree of a flow rate control valve according to the required amount of EGR gas and controlling an opening degree of the flow rate control valve on a basis of the target opening degree,
wherein the fuel reformer includes:
a housing;
a mixing portion provided in the housing and being a space mixing the fuel supplied from outside and the EGR gas;
a fuel injector disposed at a first side of the housing and supplying the fuel to the mixing portion;
an EGR pipe connected to the mixing portion in which the EGR gas flows;
a flow rate control valve disposed at the EGR pie and regulating amount of the EGR gas passing through the EGR pipe; and
a reforming catalyst portion provided at a second side of the mixing portion and reforming the fuel and EGR gas mixed in the mixing portion,
wherein a shutter device regulating the flow rate of the EGR gas flowed in through the EGR pipe and exhausted toward the mixing portion is disposed in the flow rate control valve,
wherein the shutter device is rotated toward a direction of flow of the EGR gas and of which angle is regulated, thus exhaust amount of the EGR is configured to be determined, and
wherein the exhaust amount compared with inflow amount of the EGR gas is 5% when the shutter device is rotated by 9 degrees of angle in a direction of crossing to a flow direction of the EGR gas.

2. The fuel reforming system of claim 1, wherein the exhaust amount compared with the inflow amount of the EGR gas is 30% when the shutter device is rotated by 90 degrees of angle in the direction of crossing to the flow direction of the EGR gas.

3. The fuel reforming system of claim 1, further including:
a compressor connected to the intake line and is configured to compress the reformed gas and air to supply to the engine; and
a turbine connected to the exhaust line and rotates by the exhaust gas to generate power.

4. The fuel reforming system of claim 1, further including:
a catalyst disposed in the exhaust line of a rear portion of the EGR line and purifying nitrogen oxide included in the exhaust gas.

5. The fuel reforming system of claim 4, wherein the catalyst includes a lean $NO_x$ trap (LNT) which traps the nitrogen oxide included in the exhaust gas in a lean condition and desorbs the trapped nitrogen in a rich condition, and restores the nitrogen oxide included in the exhaust gas or the desorbed nitrogen oxide.

6. The fuel reforming system of claim 4, wherein the catalyst includes a selective catalytic reducer (SCR) restoring the nitrogen oxide included in the exhaust gas by use of a reducing agent.

7. The fuel reforming system of claim 1, wherein at the EGR line, an EGR cooler cooling the reformed gas, and an EGR valve disposed at a rear end portion of the EGR cooler and regulating flow rate of the reformed gas are disposed.

8. The fuel reforming system of claim 7, wherein the reformer is disposed at a front portion of the EGR cooler in the EGR line.

9. The fuel reforming system of claim 1, wherein the EGR flow controller is configured to reduce the opening degree of the flow rate control valve when the opening degree of the flow rate control valve exceeds the target opening degree of the flow rate control valve according to a required amount of EGR gas.

10. The fuel reforming system of claim 1, wherein the EGR flow controller increases the opening degree of the flow rate control valve when the opening degree of the flow rate control valve is below the target opening degree of the flow rate control valve according to a required amount of EGR gas.

11. The fuel reforming system of claim 1, wherein the engine running condition is revolutions per minute (RPM) of the engine and an engine torque.

* * * * *